(12) United States Patent
Pschyklenk et al.

(10) Patent No.: US 11,879,728 B2
(45) Date of Patent: Jan. 23, 2024

(54) METHOD AND MEASURING APPARATUS FOR MEASURING A THREAD

(71) Applicant: Schaeffler Technologies AG & Co. KG, Herzogenaurach (DE)

(72) Inventors: Michael Pschyklenk, Röckingen (DE); Martin Mews, Herzogenaurach (DE); Martin Schmidt-Korth, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 681 days.

(21) Appl. No.: 17/048,915

(22) PCT Filed: Mar. 13, 2019

(86) PCT No.: PCT/DE2019/100222
§ 371 (c)(1),
(2) Date: Oct. 19, 2020

(87) PCT Pub. No.: WO2019/214765
PCT Pub. Date: Nov. 14, 2019

(65) Prior Publication Data
US 2021/0156663 A1    May 27, 2021

(30) Foreign Application Priority Data

May 9, 2018  (DE) ...................... 10 2018 111 108.8

(51) Int. Cl.
*G01B 7/28* (2006.01)
*G01B 7/14* (2006.01)

(52) U.S. Cl.
CPC .............. *G01B 7/284* (2013.01); *G01B 7/14* (2013.01)

(58) Field of Classification Search
CPC .......... G01B 7/284; G01B 7/14; G01B 17/06; G01B 21/20
See application file for complete search history.

(56) References Cited

U.S. PATENT DOCUMENTS

| 4,586,372 A | * | 5/1986 | Massen | ................ G01N 33/367 26/18.5 |
| 4,974,327 A | * | 12/1990 | Greenslade | .............. G01B 3/40 33/783 |

(Continued)

FOREIGN PATENT DOCUMENTS

| CN | 107110663 A | 8/2017 |
| CN | 107883871 A | 4/2018 |

(Continued)

OTHER PUBLICATIONS

Source: Title: Machine vision-based algorithm for the detection of external thread geometric parameters by Jiang Jixiang; Jun. 27, 2014; Electronic Science and Technology.

(Continued)

*Primary Examiner* — Yaritza Guadalupe-McCall

(57) ABSTRACT

A method for measuring a thread includes moving a contactless distance sensor parallel to an axial direction of the thread, recording a measurement signal corresponding to a distance of the contactless distance sensor to a top of the thread, comparing the measurement signal with a reference value lying between a maximum value and a minimum value of the measurement signal, and determining intersection points of the measurement signal with the reference value. Further steps include combining pairs of intersection points, directly following one another, into measurement value tuples, calculating mean values of the measurement value tuples, and calculating a time-angle resolution from the mean values. In an example embodiment, the thread is for a spindle of a ball screw drive.

11 Claims, 1 Drawing Sheet

(56) References Cited

U.S. PATENT DOCUMENTS

| | | | | |
|---|---|---|---|---|
| 5,322,029 A * | 6/1994 | Fujita | ............... | D05B 59/02 |
| | | | | 112/278 |
| 9,395,181 B2 * | 7/2016 | Omori | ............... | G01B 5/204 |
| 11,573,081 B2 * | 2/2023 | Merkert | ............... | G01B 21/20 |
| 2009/0101851 A1 | 4/2009 | Spalding | | |
| 2011/0238199 A1 | 9/2011 | Bonadeo et al. | | |
| 2011/0295550 A1 | 12/2011 | Bonadeo et al. | | |
| 2014/0107973 A1 | 4/2014 | Omori | | |
| 2015/0022823 A1 | 1/2015 | Bonadeo et al. | | |
| 2021/0156663 A1 * | 5/2021 | Pschyklenk | ............ | G01B 17/06 |

FOREIGN PATENT DOCUMENTS

| | | |
|---|---|---|
| DE | 19613173 A1 | 10/1997 |
| DE | 19613175 A1 | 10/1997 |
| DE | 10152038 A1 | 5/2003 |
| JP | S6227607 A | 2/1987 |
| JP | H05203441 A | 8/1993 |
| JP | H06147834 A | 5/1994 |
| JP | 2018036184 A | 3/2018 |

OTHER PUBLICATIONS

Source: Title: An automatic measuring method and system using laser triangulation scanning for the parameters of a screw thread; by Qing-bin Tong et al; 2014; Measurement Science and Technology vol. 25.

* cited by examiner

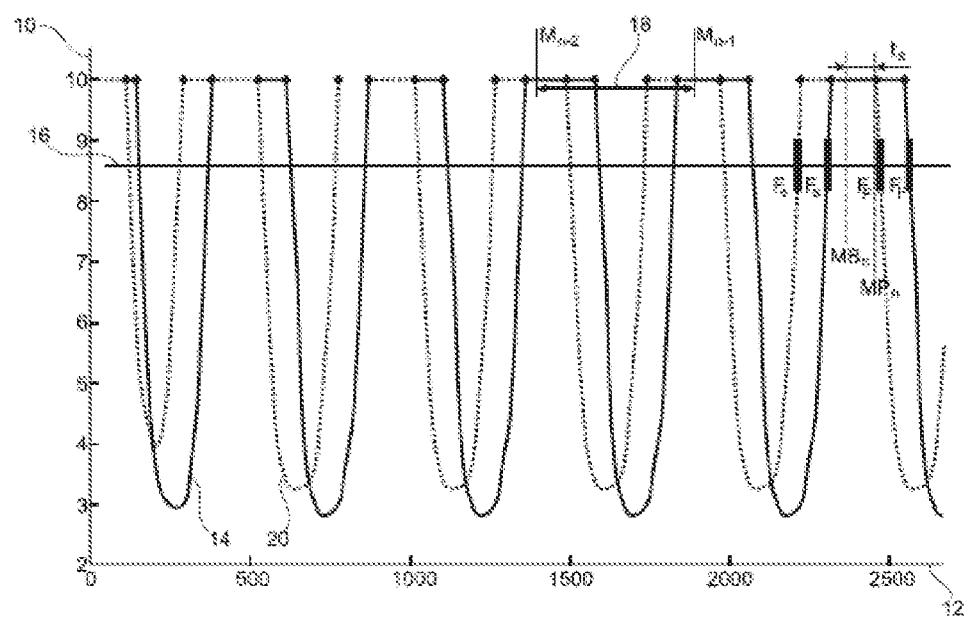

METHOD AND MEASURING APPARATUS FOR MEASURING A THREAD

CROSS-REFERENCE TO RELATED APPLICATIONS

This application is the United States National Phase of PCT Appln. No. PCT/DE2019/100222 filed Mar. 13, 2019, which claims priority to German Application No. DE102018111108.8 filed May 9, 2018, the entire disclosures of which are incorporated by reference herein.

TECHNICAL FIELD

The disclosure relates to a method and a measuring apparatus by means of which a thread can be measured.

BACKGROUND

It is known to scan the spindle of a ball screw drive with a tactile probe in order to check the properties of the spindle, e.g., the position and thread pitch of the thread in the spindle.

SUMMARY

A method is provided for measuring a thread, e.g., of a spindle of a ball screw drive, in which method a contactless distance sensor is moved parallel to the axial direction of the thread. A measurement signal corresponding to the distance between the distance sensor and the upper side of the thread, and intersection points of the measurement signal with a reference value lying between a maximum value and a minimum value of the measurement signal, are detected. Two intersection points, directly following one another, are combined into a first measurement value tuple and two intersection points, directly following one another and directly following the first measurement value tuple, are combined into a second measurement value tuple. A first mean value is calculated from the intersection points of the first measurement value tuple and a second mean value is calculated from the intersection points of the second measurement value tuple, and a time-angle resolution is calculated from the first mean value and the second mean value.

Since the measurement of the thread takes place in a contactless manner, for example with the aid of ultrasound, and does not involve contact, the measurement process can already be accelerated. In addition, no absolute values of the thread are measured. Measuring the exact position of a base of the thread is difficult and prone to errors. For this purpose, an extreme value corresponding to the base would also have to be detected in the measurement signal, which would require several calculation steps.

An intermediate area between two threads has a significant extension in the axial direction, so that the measurement value corresponding to the intermediate area lies on a plateau. This measurement value is therefore poorly resolved. In addition, the beginning and the end of the intermediate area between subsequent thread pitches may not be exactly determined, which results in significant inaccuracies from the determination of the intermediate area.

Instead, in the method, the intersection points of the measurement curve resulting from the measurement values are detected with a reference value. If the reference value lies between a maximum value occurring during the measurement and a minimum value occurring during the measurement, the reference value can, in principle, be chosen essentially as desired. Here, the knowledge is used that the flanks of the thread pitches of the threads are essentially symmetrical. This means that a center point between two points of opposing flanks of the same thread pitch arranged at the same height corresponds precisely to the base of the thread pitch. Likewise, a center point between two points arranged at the same height of flanks of subsequent thread pitches pointing away from each other lies precisely in the center of the intermediate area between the thread pitches. It is, in principle, irrelevant at what height of the thread pitch these points correspond to the reference value.

To determine these center points, the measurement values that lead to the reference value of the distance sensor are supplied in pairs to a measurement value tuple. The respective successive measurement value tuples each have two successive measurement values corresponding to the reference value, which represent the intersection point of the measurement value curve with the reference value. The mean value is determined from the respective subsequent measurement value tuples. The distance between the first mean value and the second mean value corresponds to the distance between the subsequent thread pitches in the axial direction. In addition, the number of turns of the examined thread is known, so that the axial distance between the threads corresponds to a certain angle of rotation of the thread, taking into account the number of turns.

The spindle of a ball screw drive is usually single-threaded, so that a rotation of the spindle by 360° corresponds to a feed rate equal to the axial distance of the subsequent thread pitches. In addition, the measurement times of the intersection points with the reference value are known from the measurement of the distance sensor and the measurement curve resulting therefrom, so that the time interval between the mean values is also known from their averaging. The time-angle resolution can then be calculated from this. If, for example, the travel speed and/or the travel distance of the distance sensor is also known and/or measured, the thread lead of the thread or other properties of the thread can be determined from this with the aid of the calculated time-angle resolution. By contactlessly measuring the flanks of the thread pitches of the thread at a common height, it is possible to quickly and precisely measure the properties of the thread, thus enabling a thread to be measured quickly.

The measurement tuples do not overlap. This means that all measurement values forming the intersection point with the reference value are divided into different measurement value tuples. In this case, the second measurement value tuple directly follows the first measurement value tuple, so that no intersection points remain between subsequent measurement value tuples that are not assigned to a measurement value tuple. This ensures that similar measurement values are present in each measurement value tuple, which correspond either to the falling and the rising flank of a common thread pitch or to the rising flank and the falling flank of different subsequent thread pitches.

In the case of a multiple thread, measurement value tuples that are assigned to the same thread pitch may be compared with one another. Each independent thread pitch may be measured separately in order to determine the spacing of the multiple thread, for example. Due to the rapid measurement of the thread, it is possible, for example, to produce the thread in a multi-spindle automatic lathe and to measure it during or after production without the workpiece times increasing significantly.

In an example embodiment, the measurement values are determined as a function of a measurement time from a start time or as a function of an axial displacement from a start location. The measurement curve determined by the distance sensor can be determined in a time-resolved manner, i.e., a measurement value of the distance sensor, for example a voltage, is plotted as a function of time. Alternatively, it is possible to provide the measurement curve in a spatially resolved manner, i.e., a measurement value of the distance sensor, for example a voltage, is plotted as a function of the axial measurement path of the distance sensor. If the distance sensor is moved axially with a constant travel speed, it can be easier to determine the measurement values depending on the measurement time. If the travel speed can vary during the measurement, for example due to external disturbances or measurement problems, the measurement accuracy can be maintained more easily if the measurement values are determined as a function of the axial displacement.

The time-angle resolution may be calculated from averaging a number of mean values from more than two directly following measurement value tuples. By including a plurality of mean values of a plurality of measurement value tuples, a correspondingly large number of distances between subsequent thread pitches and/or the distance from thread pitches spaced apart over a certain number of measurement value tuples can be considered. The many considered mean values allow the accuracy of the time-angle resolution determined from the averaging of the mean values to be improved.

The respective measurement value tuple may have an intersection point assigned to a rising flank of a thread pitch and an intersection point assigned to a falling flank of a subsequent thread pitch. The mean value of the respective measurement value tuple thus corresponds to the center of the intermediate area between two threads following in the axial direction. Since the central area generally has a significantly larger axial extension than the thread width, measurement inaccuracies based on the resolution accuracy of the distance sensor have a less pronounced effect. This improves the accuracy of measurement of the thread.

In an example embodiment, the measurement of the distance sensor is triggered by a trigger, which is fixed in the longitudinal direction of the thread. This results in a starting point for the measurement of the distance sensor that is precisely defined in time and/or location. This makes it possible to compare different measurements of the same thread with one another and/or with a reference measurement, for example. In addition, the axial relative position of the thread, or the axial start and/or the axial end of the thread can be measured and checked for a defined reference. However, the lead and/or lead error of the thread can also be determined without the fixed trigger.

In an example embodiment, an angular displacement of the thread in the circumferential direction to a reference angle position of a thread of the reference measurement is calculated from a displacement of the mean values to the mean values of a reference measurement. If the thread to be measured is rotated by an angular amount for the reference measurement, the respective thread pitches are positioned somewhat offset in the axial direction. This also results in an intersection point of the measurement curve with the reference value with a phase shift in time and location. This phase shift can in turn be used to infer the angular displacement of the thread to the reference measurement and/or a reference angle position associated therewith.

An unwanted angular displacement can be reversed and/or considered for subsequent steps. This allows a thread provided for a ball screw drive to be mounted precisely in a desired angular position relative to a spindle nut, whereby the precision of the ball screw drive can be improved. This makes it possible to set and/or position a desired angular position during the production of the thread, in particular of a spindle of a ball screw drive, for example.

A travel speed and/or a travel path and/or a travel time of the distance sensor may be detected. A thread lead of the thread is calculated from the distance between the first mean value and the second mean value and/or from an average of the distance between a plurality of successive mean values. By considering the movement behavior of the distance sensor, further properties of the thread can be measured and checked from the measurement curve. For example, the thread lead and/or the pitch in the case of a multiple thread can be calculated.

The thread of a spindle of a ball screw drive may be measured. Due to the precise measurement and testing of the thread, the thread can meet the highest precision requirements. This makes it possible to produce threads for ball screw drives at high production speeds, which can be used in machine tools and high-precision applications, for example. A specific linear position of the ball screw drive can be controlled with high precision.

The disclosure further relates to a measuring apparatus for measuring a thread, e.g., a spindle of a ball screw drive, with a holding device for holding a thread, a contactless distance sensor that can be moved parallel to the axial direction of the thread, and an evaluation device for evaluating the measurement signal detected by the distance sensor. The evaluation device is used for implementing the method, which can be designed and developed as described above. By contactlessly measuring the flanks of the thread pitches of the thread at a common height, it is possible to quickly and precisely measure the properties of the thread, thus enabling a thread to be measured quickly.

BRIEF DESCRIPTION OF THE DRAWINGS

In the following, the disclosure is explained by way of example with reference to the attached drawings showing exemplary embodiments. The features shown below can represent an aspect of the disclosure both individually and in combination, wherein:

the FIGURE shows a schematic diagram of measurement curves obtained with a method for measuring a thread.

DETAILED DESCRIPTION

The diagram shown in the FIGURE shows the measurement value of a contactless distance sensor representing a voltage 10 in Volts as a function of a measurement time 12 in seconds. The measurement values of the distance sensor result in a measurement curve 14, which essentially corresponds to the course of a thread to be measured along an axial line. The measurement curve 14 intersects a reference value 16, which lies almost arbitrarily between a maximum value and a minimum value of the measurement curve 14. The measurement curve 14 intersects the reference value 16 with a rising flank of a thread pitch with a positive lead in a first intersection point $F_S$ and with a falling flank of the thread pitch with a negative lead in a second intersection point $F_F$. These two intersection points $F_S$ and $F_F$ form a measurement value tuple from which a mean value $M_n$ is formed, for example according to $$M_n = \frac{F_F(n+1) - F_S(n)}{2} + F_S(n)$$

where n is the nth considered thread pitch of the thread. Given a total number of N thread pitches considered, which follow one another in the axial direction, a time-angle resolution ZW of $$ZW = \frac{1}{N-1} \cdot \sum_{n=1}^{N-1} \frac{M_{n+1} - M_n}{360°}$$

results for a single thread when averaging over the thread pitches considered.

A thread lead 18 can be determined from the distance between two subsequent mean values, for example $M_n$ and $M_{n+1}$, in particular for a single thread. For better clarity, this is shown in an exemplary manner in the diagram shown with the mean values $M_{n-1}$ and $M_{n-2}$. In addition, the measurement curve 14 can be compared with a reference curve 20. If the thread is rotated by an angular amount in relation to the angular position of the thread of the reference curve 20, there results a temporal phase difference $t_s$ between the mean value $MP_n$ of the measurement curve 14 and the corresponding mean value $MB_n$ of the reference curve 20, according to $$t_s = t(MB_n) - t(MP_n).$$

From this, an angular displacement $\Delta\varphi$ between the angular position of the thread of the measurement curve 14 and the angular position of the thread of the reference curve 20 in the circumferential direction can be determined, according to $$\Delta\varphi = t_s \cdot ZW.$$

REFERENCE NUMERALS

10 Voltage
12 Measurement time
14 Measurement curve
16 Reference value
18 Thread lead
20 Reference curve
ZW Time-angle resolution
$F_S$ Intersection rising flank
$F_F$ Intersection falling flank
$M_n$ Mean value
$MP_n$ Mean value of the measurement curve
$MB_n$ Mean value of the reference curve
$t_s$ Phase difference
$\Delta\varphi$ Angular displacement

The invention claimed is:

1. A method for measuring a thread, comprising:
   moving a contactless distance sensor parallel to an axial direction of the thread;
   recording a measurement signal corresponding to a distance of the contactless distance sensor to a top of the thread;
   comparing the measurement signal with a reference value lying between a maximum value and a minimum value of the measurement signal;
   determining intersection points of the measurement signal with the reference value;
   combining a first two intersection points, directly following one another, into a first measurement value tuple;
   combining a second two intersection points, directly following one another and directly following the first two intersection points, into a second measurement value tuple;
   calculating a first mean value of the first measurement value tuple;
   calculating a second mean value of the second measurement value tuple; and
   calculating a time-angle resolution from the first mean value and the second mean value.

2. The method of claim 1, wherein the thread is for a spindle of a ball screw drive.

3. The method of claim 1, wherein the measurement signal is determined as a function of a measurement time from a start time or as a function of an axial displacement from a start location.

4. The method of claim 1, further comprising:
   combining n pairs of consecutive intersection points into n measurement value tuples;
   calculating n mean values from the n measurement value tuples; and
   calculating the time-angle resolution from the n mean values.

5. The method of claim 1, wherein each of the first measurement value tuple and the second measurement value tuple comprises:
   a first intersection point associated with a rising flank of a thread pitch; and
   a second intersection point associated with a falling flank of a subsequent thread pitch.

6. The method of claim 1, wherein the step of recording a measurement signal is triggered by a trigger, the trigger being fixed in a longitudinal direction of the thread.

7. The method of claim 1, further comprising calculating an angular displacement of the thread in a circumferential direction relative to a reference angular position of a reference curve of a reference thread from an offset of the first mean value or the second mean value relative to a reference mean value of the reference curve.

8. The method of claim 1, further comprising determining a travel speed or a travel path or a travel time of the contactless distance sensor by calculating a thread pitch of the thread from:
   a distance between the first mean value and the second mean value; or
   an average of n–1 distances between n mean values calculated by:
      combining n pairs of consecutive intersection points into n measurement value tuples; and
      calculating the n mean values from the n measurement value tuples.

9. The method of claim 1 further comprising measuring a thread of a spindle of a ball screw drive.

10. A measuring apparatus for implementing the method of claim 1, comprising:
    a holding device for holding the thread;
    the contactless distance sensor movable parallel to the axial direction of the thread; and
    an evaluation device for evaluating the measurement signal using the method of claim 1.

11. The measuring apparatus of claim 10, where the thread is for a spindle of a ball screw drive.

* * * * *